United States Patent [19]
Horton

[11] Patent Number: 6,055,925
[45] Date of Patent: May 2, 2000

[54] AIR GAUGE WHEEL

[76] Inventor: William E. Horton, 1325 Jessica, Las Vegas, Nev. 89014

[21] Appl. No.: 08/815,178

[22] Filed: Oct. 25, 1996

Related U.S. Application Data

[63] Continuation-in-part of application No. 08/369,544, Jan. 6, 1995, abandoned, which is a continuation-in-part of application No. 08/304,609, Sep. 12, 1994, abandoned, which is a continuation of application No. 07/766,052, Sep. 26, 1994, abandoned.

[51] Int. Cl.[7] ............................ B60C 23/02; G01D 13/10
[52] U.S. Cl. ...................... 116/34 R; 116/271; 116/292; 73/146.3
[58] Field of Search .................. 116/34 R, 271, 116/292, 291, 294, 295; 73/146.2, 146.3

[56] References Cited

U.S. PATENT DOCUMENTS

| | | | |
|---|---|---|---|
| 1,019,674 | 3/1912 | Lotbiniere | 116/34 R |
| 1,216,192 | 2/1917 | Weinandt | 73/146.3 |
| 1,601,315 | 9/1926 | Manning | 73/146.3 |
| 1,812,549 | 6/1931 | Peace | 116/292 |
| 2,168,145 | 8/1939 | Willis | 73/146.3 |
| 2,190,530 | 2/1940 | Clarkson | 116/34 R |
| 2,747,409 | 5/1956 | Trinca | 73/146.3 |
| 2,800,795 | 7/1957 | Trinca | 116/34 R |
| 2,842,091 | 7/1958 | Kennedy | 116/292 |
| 2,988,041 | 6/1961 | Schmitz, Jr. et al. | 116/292 |
| 3,338,103 | 8/1967 | Lohrs et al. | 116/292 |
| 3,707,676 | 12/1972 | De Bretagne et al. | 116/292 |
| 3,717,030 | 2/1973 | McGhee et al. | 73/146.3 |
| 3,719,159 | 3/1973 | Davis | 116/34 R |
| 3,999,503 | 12/1976 | Brannis et al. | 116/34 R |
| 4,051,803 | 10/1977 | Arnone | 116/34 R |
| 4,539,928 | 9/1985 | Todhunter et al. | 116/34 R |
| 4,723,445 | 2/1988 | Ripley et al. | 73/146.3 |
| 5,090,237 | 2/1992 | Schrumpf et al. | 116/34 R |
| 5,191,797 | 3/1993 | Smith | 116/34 R |

FOREIGN PATENT DOCUMENTS

| | | |
|---|---|---|
| 662038 | 4/1963 | Canada . |
| 251355 | 1/1988 | European Pat. Off. . |
| 554885 | 6/1923 | France . |
| 270380 | of 1930 | Italy . |
| 313800 | of 1934 | Italy . |
| 1144506 | 3/1969 | United Kingdom . |

OTHER PUBLICATIONS

3D The Direct Drive Difference; 3D Instruments, Inc.; Aug. 1994; 2 pages.

*Primary Examiner*—Hezron Williams
*Assistant Examiner*—Willie Morris Worth
*Attorney, Agent, or Firm*—Sidley & Austin

[57] ABSTRACT

An improved new wheel (10) is disclosed which has an integral air pressure gauge (24, 100, 200). A passage (34) extends from the rim surface (22) exposed to the tire interior directly to the tire gauge (24, 100, 200) mounted within a recess (26) within the wheel hub portion (12). An adjustable numericaless colored scale (32) is adjusted to indicate proper inflation at the position of the indicator needle (30) when the tire is first inflated to the proper pressure to calibrate the scale. The tire gauge (200) can be precalibrated at the factory by positioning the dial scale (202) in a predetermined orientation to the case so that, at the desired predetermined pressure, the indicator needle (30) is aligned in the area (116) of proper inflation along the center line (104).

5 Claims, 3 Drawing Sheets

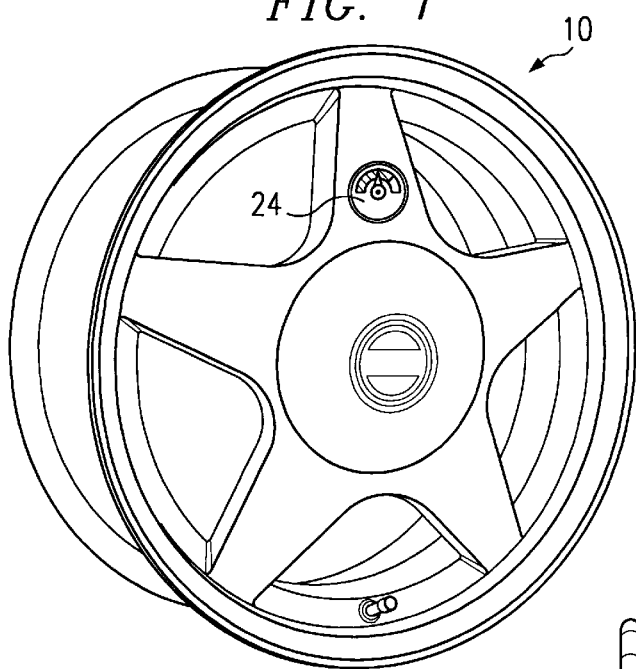
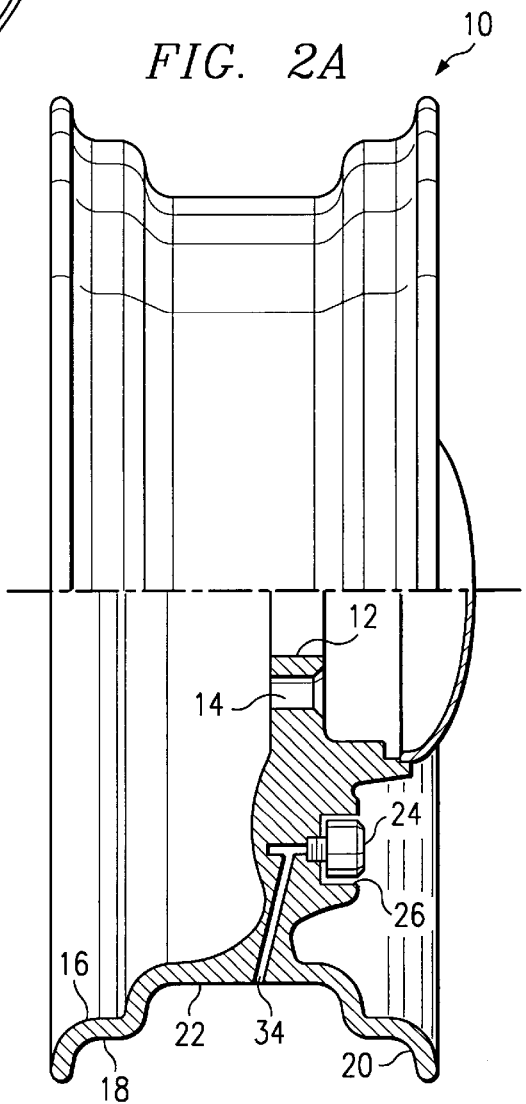
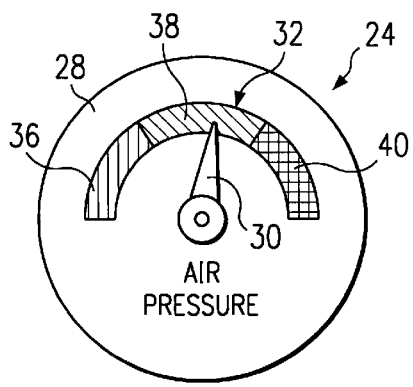

AIR GAUGE WHEEL

CROSS REFERENCE TO RELATED APPLICATIONS

This is a continuation-in-part of U.S. patent application Ser. No. 08/369,544 filed Jan. 6, 1995, now abandoned which was a continuation-in-part of U.S. patent application Ser. No. 08/304,609 filed Sep. 12, 1994, now abandoned which is a continuation of U.S. patent application Ser. No. 07/766,052 filed Sep. 26, 1994 now abandoned.

TECHNICAL FIELD OF THE INVENTION

This invention relates to a new wheel for a vehicle, and in particular to a mechanism to continuously monitor air pressure in a tire mounted on or built in the wheel.

BACKGROUND OF THE INVENTION

Maintaining correct air pressure in a tire is one of the most important factors in maintaining tire performance, safety and service life. A careful driver will have the air pressure checked regularly with a hand held air pressure gauge pushed momentarily onto the tire valve stem. Unfortunately, it is not uncommon to forget to check the tire pressure and the pressure can easily vary from the optimum range because of temperature change or slow leakage. An underinflated tire will generate far more friction than a properly inflated tire, which at a minimum reduces the fuel efficiency of the vehicle. Underinflation also can lead to such severe heat buildup in the tire that the tire itself is destroyed.

A need exists to develop an improved, easily used technique for monitoring tire air pressure. Many attempts have been made to do this, including U.S. Pat. No. 3,719,159 to Davis issued Mar. 6, 1973, U.S. Pat. No. 3,977,355 to Lorenz et al. issued Aug. 31, 1976 and U.S. Pat. No. 4,476,803 to Malec issued Oct. 16, 1984. However, these prior concepts have not fulfilled this need.

SUMMARY OF THE INVENTION

In accordance with one aspect of the present invention, an improved wheel is provided for a vehicle which includes a rim portion engaging a tubeless tire. Pressurized air is maintained in the interior of the tire with the rim portion having a passage extending from the tire interior into the rim portion. The wheel also includes a hub portion having a recess and an air pressure gauge mounted in the recess. The passage extends into the recess and is connected to the air pressure gauge to sense the air pressure within the tire interior.

In accordance with another aspect of the present invention, the air pressure gauge has an indicating needle which moves relative a numericaless color-coded adjustable scale to indicate the true tire pressure. The adjustable scale is color-coded to assist the observer to easily and readily identify a condition of pressure out of the desired range. The scale is also adjustable and positionable about the rotation axis of the indicating pointer or needle to permit the scale to be calibrated in relation to the pointer or needle at the initial air inflation pressure required. After calibration, the scale will provide an accurate indication of correct tire inflation from then on.

BRIEF DESCRIPTION OF THE DRAWINGS

FIG. 1 is a frontal view of the face of the tire gauge illustrating the color-coded scale;

FIG. 2A is a partial cross-sectional view of the wheel illustrating the air passage and air gauge;

FIG. 2B is a frontal view of the face of the air gauge of FIG. 2A.

DETAILED DESCRIPTION

Figure 3:
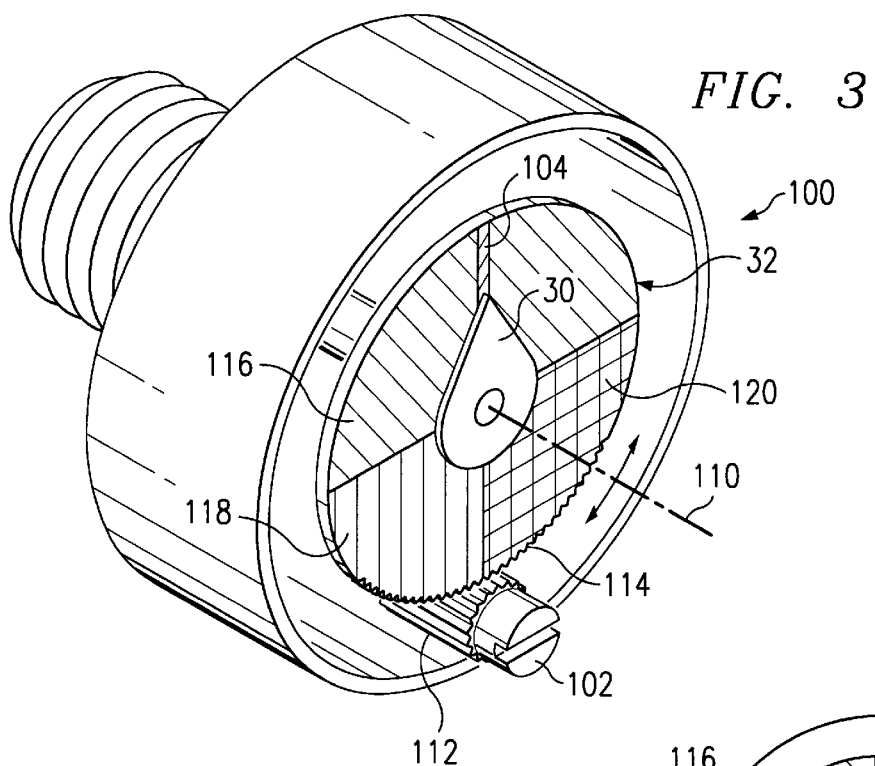
FIG. 3 is a perspective view of a modified tire gauge using an adjustable numericaless colored scale.
Figure 4:
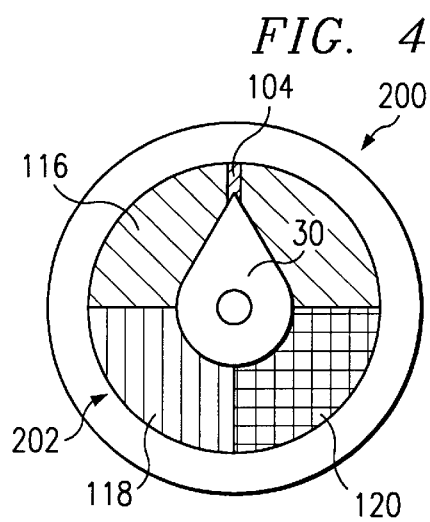
FIG. 4 is a frontal view of a second modified tire gauge illustrating the color coded scale.

With reference now to the FIGURES, wherein like reference numerals designate like or corresponding parts throughout the several views, there is shown in FIGS. 1 and 2A and 2B a wheel 10 which forms a first embodiment of the present invention. The wheel 10 includes many features which are common to well known automotive wheels for mounting tubeless tires. For example, wheel 10 has a hub portion 12 which is designed with the appropriate bolt holes 14 to bolt the wheel onto a vehicle. The wheel 10 also includes a rim portion 16 with rims 18 and 20 which engage the sidewalls of the tire to form an airtight seal so that a desired air pressure can be maintained in the interior of the tire. As is well understood, the rim surface 22 extending between the rims 18 and 20 is exposed to the tire pressure and, in fact, forms part of the enclosure which maintains the air pressure, along with the interior surface of the tire itself.

With reference to FIGS. 1, 2A and 2B, the wheel 10 can be seen to include an integral numericaless tire gauge 24 which is actually mounted within a recess 26 in the hub portion of the wheel. The gauge 24 has a face 28 through which can be seen the indicating needle 30 and a numericaless color coded scale 32.

A passage 34 is formed through the rim portion 16 and hub portion 12 which extends from the rim surface 22 into the recess 26. The passage is operably connected to the pressure sensing elements within the gauge 24. For example, the passage opening into the recess 26 can be threaded with female thread to receive a male threaded portion of the gauge 24 to both convey the air pressure to the gauge and also hold the gauge within the recess. Thus, the position of the indicating needle 30 is determined by the tire pressure within the passage 34.

The scale 32 is color-coded to provide at least three different colors 36, 38, and 40 along the scale. The range 38, which is preferably green, indicates a normal tire pressure range, and if the indicator needle 30 is within this range, the vehicle operator can be assured that the tire pressure is proper. The lower range 36 is preferably red colored. If the operator sees the needle 30 within the range 36, the operator knows to immediately add air to the tire until the indicator needle moves into range 38. Range 40 is preferably colored yellow. If the operator sees the needle 30 in the yellow range, the operator will know that air should be bled from the tire until the indicator needle falls within the range 38. It is appropriate that range 40 be a less alarming color than range 36 as tire overpressure is generally not as severe a problem as low inflation pressure.

Previous designs which attempted to mount air pressure gauges within or on a wheel have been overly complex or included an air path which is overly tortious. Prior designs have utilized plungers, pistons, springs, diaphragms, seals, and rubber and metal hoses, all of which are subject to failure. Electronics and acoustical signal devices have also been used, which also are subject to failure and difficult to get to read numerical markings of hand-held gauges being pushed momentarily and repeatedly onto the tire valve stem.

In contrast, the device of the present invention is a simple and direct connection between the tire interior and the pressure sensing elements of the gauge 24, providing a reliable measuring technique. Because of the color-coded scale, the operator of the vehicle can ascertain with a glance that the tire pressure is correct. Further, when the gauge's dial is properly adjusted by the tire service man for the tire, the operator from thereon need only fill the tire with air through the tire valve stem until the needle is within the green area. This relieves the operator of the necessity of looking in the vehicle manual or a hand-held gauge to determine the proper tire pressure. It also eliminates the time consuming and annoying process of filling the tire by alternately filling and checking the tire pressure until the operator finally achieves the desired pressure.

Of course, while the improved wheel 10 has been described for use with a conventional automobile, the wheel could as easily be adapted for use on trucks, motorcycles, bicycles, aircraft and trailers. In fact, wherever an application utilizes an inflated tire or tube, the advantages of the present invention can be employed.

With reference now to FIG. 3, a modification of the present invention is illustrated as tire gauge 100. A number of elements of tire gauge 100 are identical to that of tire gauge 24 and are identified by the same reference numeral. In tire gauge 100, the scale 32 is mounted in a manner to be adjustable by an adjustment mechanism, such as a set screw 102 mounted on the gauge. The color-coded numericaless scale 32 is mounted on gauge 100 to pivot about the pivot axis 110 of the indicating needle 30. In this design, the vehicle operator can inflate the tire to the proper inflation pressure using a conventional tire pressure gauge. Once the proper pressure is set, the set screw can be turned, as by a small screw driver, to pivot scale 32 until the middle of the green area 116 on scale 32 is moved under the gauge's needle 30. This calibrates the scale 32 to the particular tire pressure desired. The set screw 102 preferably has teeth 112 which mesh with teeth 114 on scale 32 so that turning set screw 102 will pivot scale 32 about axis 110. From then on, the vehicle operator need only glance at the scale to see if the needle 30 is still within the green area. If not, the operator knows that the tire need only be filled with air or air let out to bring the needle back into the middle of the green range.

As illustrated in FIG. 3, the scale 32 can also include a bold green center line 104, of a different shade of green than area 116, which represents mid range in the green color. This permits the user to align center line 104 with the indicator needle 30 when the tire is initially filled to the proper inflation pressure and thereafter more accurately detect a variation of pressure from the ideal.

When the needle is on the bold green center line, the tire's air pressure is perfect. When the indicator needle 30 is in the green, but toward the red area 118, the tire is slightly under inflated. When the pointer is toward the yellow area 120 from the green center line but still within the green area, the tire is slightly overinflated. The motorist could have a small, hand held pressurized container of air that fits conveniently in any glove compartment and use this container to inflate the tire while looking at the air gauge pointer. When the pointer arrives at the center line 104 of the green area, the air pressure is perfectly adjusted. After calibration, clearly, when needle 30 is in the red area 118, the pressure is very low, and when the needle 30 is in yellow area 120, the pressure is too high.

The use of the adjustable scale provides a number of advantages. The same scale can be used for many different vehicles and tire types as the scale has no absolute pressure values on it. Also, the adjustable scale allows a user to set in different pressures in the front and back tires at the initial calibration and thereafter maintain the desired pressures by simply referring to the scales.

The invention is a "new motor vehicle wheel" that has its own built-in gauge which is a new "numericaless color-coded" gauge. The "color positions can be changed by the dial's adjustment new feature" to accommodate the different air-pressures of tires of all motor vehicles.

Figure 5:
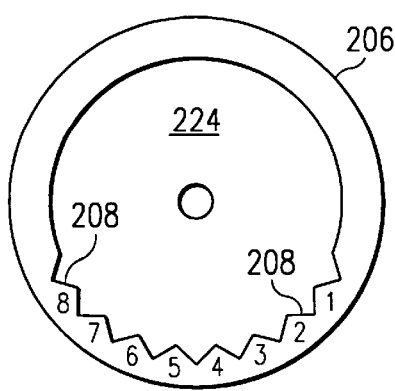
FIG. 5 is a frontal view of a portion of the tire gauge of FIG. 4 illustrating the tooth notches.
Figure 6:
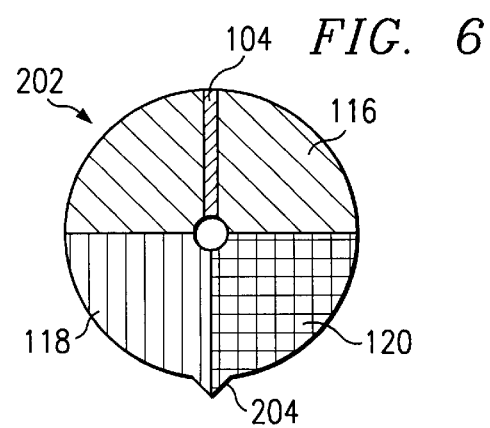
FIG. 6 is a frontal view of the color coded scale of the tire gauge of FIG. 3.
Figure 7:
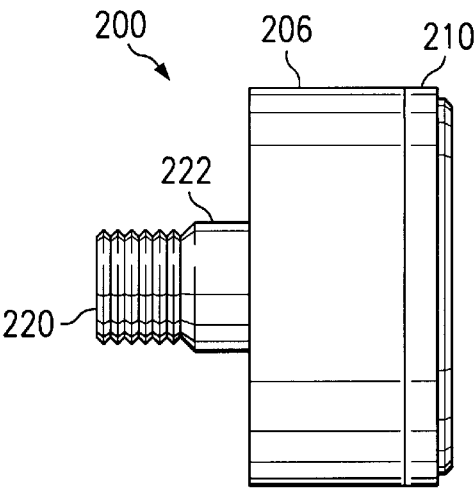
FIG. 7 is a side view of the tire gauge of FIG. 3.
Figure 8A:
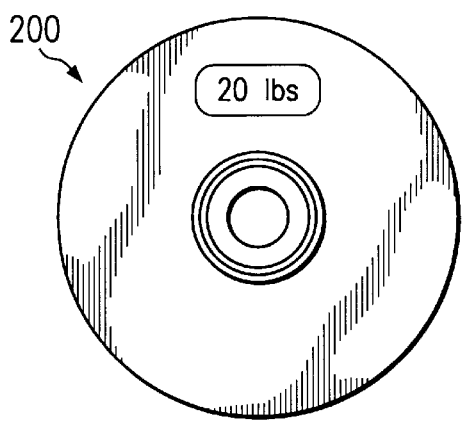
FIGS. 8A, 8B, 8C and 8D are back views of tire gauges of the type illustrated in FIG. 3 calibrated for different tire pressures.
Figure 8B:
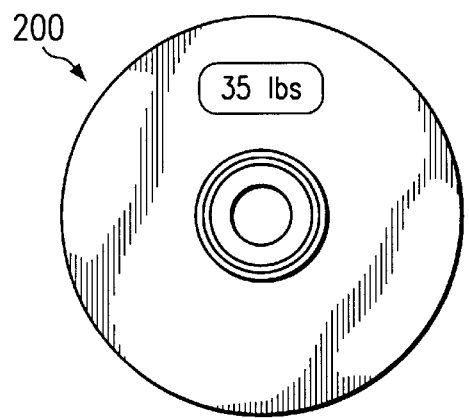
Figure 8C:
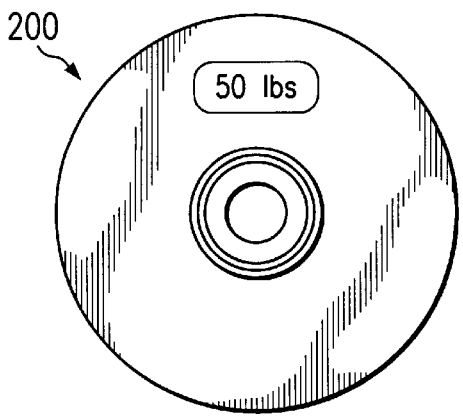
Figure 8D:
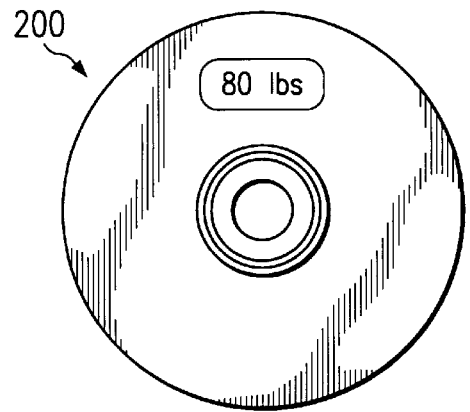

With reference now to FIGS. 4–8, a second modified tire gauge 200 will be described. Many of the elements of tire gauge 200 are identical to those of gauges 24 and 100 described above, and identical elements are denoted by identical reference numerals. Tire gauge 200 is precalibrated at the factory for a particular tire pressure and wheel application. Tire gauge 200 is mounted in wheel 10 by gauge mounting threads 220 on the stem 222 of the gauge to measure the tire pressure continuously. The tire gauge 200 has a numericaless color coded scale 202 similar to scale 32. However, scale 202 has a tooth 204 extending from one edge thereof as seen in FIG. 6. The case 206 of the tire gauge 200, as seen in FIG. 5, has a series of tooth notches 208 therein.

The gauge 200 may be capable of, for example, measuring tire pressure between the design limits of the gauge, for example, zero to 100 psi. The position of the indicating needle 30 is, of course, dependent upon the tire pressure being measured. Each particular tire gauge 200 will be selected for use at a given predetermined pressure, such as 30 psi, depending on the application needed. The manufacturer will position the scale 202 within the case 206 so that the tooth 204 fits in whichever one of the tooth notches 208 would result in the center line 104 being positioned at the point where the indicating needle 30 will point when the correct tire pressure exists for the given application, for example at 30 psi. The case has a mounting surface 224 which sandwiches the scale 202 between the front gauge cover 210 and surface 224 once the scale 202 is properly oriented in the case and the cover 210 is mounted on the case, so that the scale 202 cannot rotate thereafter, even when subjected to the severe vibration and shock encountered in service. Thus, the frictional interaction between surface 224, the scale 202 and the cover 210 holds the scale fixed once the cover 210 is mounted on the gauge. Of course, the engagement between the tooth 204 and a notch 208 assists in preventing movement of the scale 202 as well.

As shown in FIGS. 8A–8D, the calibrated pressure is marked on the outside of the tire gauge 200 so that the proper precalibrated tire gauge 200 is used with the proper installation. Thus, the tire gauges shown in FIGS. 8A–8D have their scales 202 positioned so that the is needle 30 is aligned with center line 104 at tire pressures of 20 psi, 35 psi, 50 psi and 80 psi, respectively.

By precalibrating the dial indication, the gauge becomes tamper proof and foolproof and cannot be inadvertently changed. Because the calibration is within the gauge itself, the integrity of the calibration will be ensured. However, if desired, the front gauge cover 210, seen in FIG. 7, can be removed by a specialist, or knowledgeable service technician and recalibrated, if desired. For example, if the specialist does not have the correctly calibrated gauge on the shelf, it would be a relatively simple matter for the specialist to remove the cover 210 and recalibrate the gauge to the pressure needed. Preferably, the specialist will be provided with information as to the variation in set point pressures between the positions of each of the tooth notches 202. This information can be provided independent of the gauge or even stamped on the gauge case itself, if desired. For example, the number 1 notch may be calibrated for a pressure of 20 psi while the number 4 notch is calibrated for 30 psi.

Clearly, a tire gauge 200 can be adapted for use on truck tires as well. A single gauge can be used to cover the whole range of automotive, truck and other vehicle requirements. Alternatively, several basic gauge constructions may be required to cover the entire pressure range needed. For example, a gauge designed for use with a truck wheel may be designed for a pressure range of, for example, zero to 200 psi, with the scale 32 positioned to indicate correct inflation pressure at, for example, 80 psi or any other pressure in the possible range.

If necessary or desired, the color coded scale 202 can have two or more teeth 204 engaging notches 208 for greater strength. Alternatively, the color coded scale 202 can be provided with a series of tooth notches while the case 206 has one or more teeth. Clearly, other orienting structure can be used, such as dimples, clamps, or the like. The important consideration is to precalibrate the scale 202 at the factory for the optimum tire pressure for the application contemplated.

As noted, the tooth or teeth of the scale 202 can be placed in a fixed position into any of the peripheral series of notches 208 in the gauge body chosen at the time of factory assembly. These calibration notches 208 are for different tire air pressures for lining up the gauge's pointer 30 on the center line 104 of the green area of the dial. These notches will keep the tire gauge tamper proof from motorists or anyone else. Except, as noted, a serviceman can adjust the dial scale 202 for a reason, such as installing special tires requiring a different tire pressure. Clearly, as an alternative, the serviceman could install another gauge already calibrated for the different tire air pressure.

Even by taking a leisurely walk around the motor vehicle (car or truck, etc), even from a distance of 20 feet from the wheels, it takes a mere glance at the wheels to easily monitor the tire's air pressure without the hassle associated with hunting for and using a conventional hand-held air gauge to read its numerical markings while bending over and down at each conventional wheel and also squinting at the numerical markings of a conventional hand-held gauge or gauges. The invention is a new, easy way to monitor correct air pressure and heat by looking at a large, wheel-mounted, numericaless color-coded gauge.

Although one embodiment of the invention has been illustrated in the accompanying drawings and described in the foregoing detailed description, it will be understood that the invention is not limited to the embodiment disclosed, but is capable of numerous rearrangements, modifications and substitutions of parts and elements without departing from the scope and spirit of the invention.

I claim:

1. An air pressure gauge for a vehicle to measure air pressure in a tire, comprising:

a case;

a pressure indicating needle operatively connected to the case;

a numericaless scale operatively connected to the case; wherein the numericaless scale has a tooth thereon, the case having a plurality of tooth engaging notches in a position to provide a precalibrated orientation of the numericaless scale relative to the case with said tooth received in one of said notches, and thus establishing a precalibrated orientation to the pressure indicating needle;

the needle moving relative to the case in direct relation to the air pressure in a tire to indicate the tire pressure, the numericaless scale being color coded to assist the observer to readily identify a condition of the pressure out of the desired range by observing the position of the pressure indicating needle relative to the numericaless scale; and an indexing mechanism mounted to the case to fix the numericaless scale in a predetermined orientation relative to the case of the air pressure gauge to fix the calibration of the numericaless scale relative to the pressure indicating needle.

2. A new wheel for a vehicle, the wheel mounting a tubeless tire, comprising:

a hub portion having a recess;

an air pressure gauge mounted in said recess;

a rim portion engaging the tubeless tire with pressurized air in the interior of the tire, the rim portion having a passage formed therein opening into the tire interior and extending to the recess, the air pressure gauge sensing the air pressure within the passage;

said air pressure gauge having a pressure indicating needle and a numericaless scale operatively connected to the gauge, the needle moving relative to the scale to indicate the tire pressure, the numericaless scale being color coded to assist the observer to readily identify a condition of the pressure out of the desired range; and the numericaless scale being adjustable relative the indicating needle to calibrate the scale.

3. The wheel of claim 2 further having a set screw mounted on the air pressure gauge to adjust the numericaless scale.

4. The air pressure gauge of claim 1 wherein the case has a mounting surface and a front gauge cover, the numericaless scale being sandwiched between the front gauge cover and the mounting surface when the scale is properly oriented in the case.

5. The wheel for a vehicle of claim 2 wherein the numericaless scale has a case engaging member fixed thereon, the case having at least one numericaless scale engaging member fixed thereon, said members engaging in a position to provide a precalibrated orientation of the numericaless scale relative to the case and thus establishing a precalibrated orientation to the pressure indicating needle.

* * * * *